APPARATUS FOR PERFORMING CONDITIONAL SUBTRACTION

Filed April 28, 1960

United States Patent Office 3,045,913

Patented July 24, 1962

3,045,913

APPARATUS FOR PERFORMING CONDITIONAL SUBTRACTION

Frederick C. Hallden, Floral Park, N.Y., and Joseph M. Rodriguez, Tampa, Fla., assignors to Hazeltine Research Inc., a corporation of Illinois Filed Apr. 28, 1960, Ser. No. 25,381
7 Claims. (Cl. 235—155)

Figure 1:
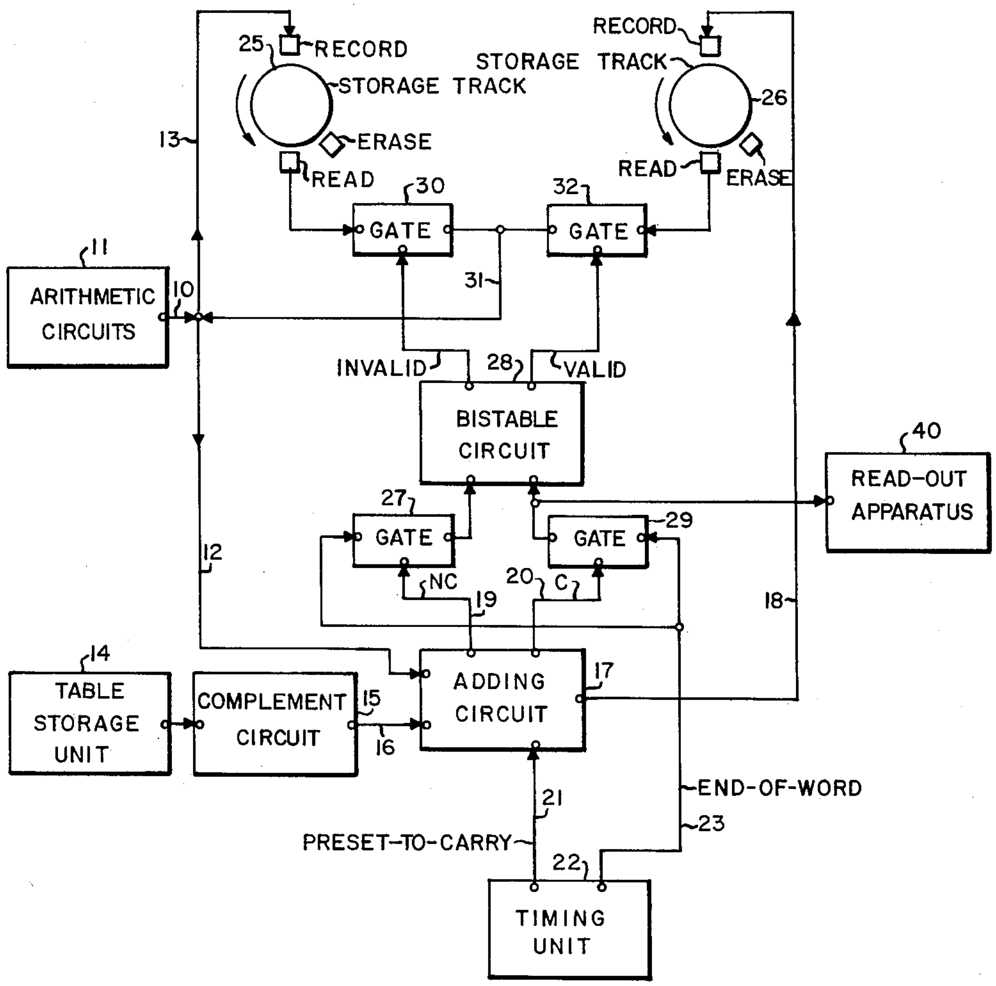

The present invention relates to apparatus for performing conditional subtraction in an uninterrupted series of word cycles. In particular, it relates to apparatus which is useful in transferring a number from within a digital computer to some form of read-out device and which is also capable of converting the number from one code to another, for example, from binary to binary-coded-decimal.

Heretofore it has been conventional practice to utilize a process of conditional subtraction to determine the numerical content of an unknown number in a digital computer. In this process a plurality of subtrahend numbers of known value ranging in descending numerical order, in accordance with a prescribed code such as binary-coded-decimal, are sequentially subtracted from the unknown number representing the minuend and which may exist in another code, such as pure binary. As long as the subtrahend is larger than the minuend, each subtraction is an invalid one and the output signal may contain a "0" to indicate each of such invalid subtractions. At at time when the subtrahend is smaller than the minuend, a valid subtraction results and a "1" in the output signal indicates the valid subtraction. Thus, in the process of conditional subtraction, the invalid subtractions utilizing hte unknown number as the minuend continue until the known subtrahend number is smaller than the unknown minuend and a "1" occurs in the output signal. The difference resulting from this valid subtraction is then utilized as a minuend for the next series of subtractions until another valid subtraction occurs whereupon a "1" again appears in the output signal. The difference signal resulting from this second valid subtraction becomes the minuend for the next series of subtractions and so on until the series of known numbers has been exhausted, by which time the original unknown number, as it existed in the originally coded form, has been reduced to zero and the output signal now represents the unknown number in its newly coded form. The code in which the output signal appears depends, of course, on the arrangement of the descending numerical order of the known subtrahend numbers.

A problem with apparatus heretofore utilized for this conditional subtraction process is that each time there is an invalid subtraction, the conditional subtraction process must be interrupted to enable the apparatus to regenerate the original minuend since in known circuits the original minuend becomes lost upon subtraction. Some arrangements have been proposed whereby the minuend is retained in a temporary storage device during the subtraction cycle and, if necessary, is used as the minuend in the next subtraction cycle thereby avoiding the need for regeneration of the minuend. However, such proposed arrangements generally require special subtraction circuits which tend to undesirably raise the cost of the apparatus.

Accordingly, it is an object of the present invention to provide new and improved apparatus for performing conditional subtraction which avoids the disadvantages of prior known such apparatus.

It is also an object of the present invention to provide apparatus for performing conditional subtraction in an uninterrupted series of word cycles without the need for regeneration of the minuend in the case of invalid subtractions.

It is also an object of the invention to provide apparatus for performing conditional subtraction which is capable of converting the code of the unknown number during the process.

In accordance with the present invention, apparatus for performing conditional subtraction in an uninterrupted series of word cycles comprises means for supplying two serial signals representative of binary minuend and subtrahend numbers, one of said signals being supplied in binary complement form. The apparatus also includes an adding circuit responsive to the supplied signals for developing an output signal representative of the difference between the two numbers and means for starting the adding circuit off on a carry status at the beginning of each word cycle. The apparatus also includes temporary storage means for storing the minuend and difference signals during each word cycle and being responsive to the carry status of the adding circuit at the end of each cycle for presenting the stored minuend signal to the adding circuit as the minuend in the next succeeding cycle if the adding circuit ends in a status indicative of an invalid subtraction and for presenting the stored difference signal if the adding circuit ends in a status indicative of a valid subtraction.

For a better understanding of the present invention, together with other and further objects thereof, reference is had to the following description taken in connection with the accompanying drawings, and its scope will be pointed out in the appended claims.

Figure 2:
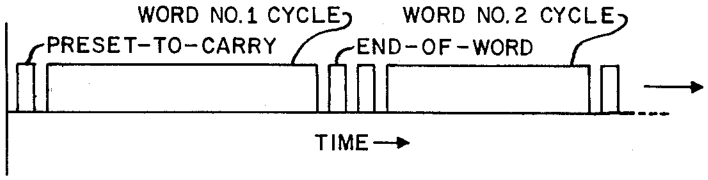

Referring to the drawing:

FIG. 1 is a schematic diagram of conditional subtraction apparatus constructed in accordance with the present invention, and FIG. 2 is a timing diagram useful in understanding the present invention.

*Description of FIG. 1 Apparatus*

Considering now more particularly FIG. 1 of the drawings, there is shown therein an apparatus for performing conditional subtraction in an uninterrupted series of word cycles comprising means for supplying two serial signals representative of binary minuend and subtrahend numbers, one of the two signals, preferably the one representative of the subtrahend number, being supplied in binary complement form. This may include input line 10 coupled to the arithmetic circuits 11 in a digital computer, such circuits being of conventional construction to provide on line 10 a serial signal representative of a binary number which is to be transferred to read-out apparatus in binary-coded-decimal form. The signal on line 10 is coupled by line 12 to one input of adding circuit 17 and also by line 13 to the recording head of storage track 25. Also included in the supply means is table storage unit 14 which may be a conventional permanent storage unit adapted to provide at the output thereof a serial signal representative of a series of binary numbers ranging in descending numerical order in successive word cycles. The manner in which the numbers in the series range in descending order depends on the type of code conversion, if any, to be performed by the apparatus of the invention. In the apparatus of FIG. 1, the numbers range in binary-coded-decimal form, that is, although each number is in binary form, they recur in binary-coded-decimal or 8 4 2 1 form. Preferably the largest number supplied by the arithmetic circuits 11 is no greater than the sum of all the numbers in the series supplied by table storage unit 14. The signal at the output of unit 14 is translated through a conventional complement circuit 15 wherein the binary complement of the numbers from unit 14 is generated and then coupled by means of line 16 to a second input of adding circuit 17.

The apparatus also includes adding circuit 17 responsive to the supplied minuend and subtrahend signals on lines 12 and 16, respectively, for developing an output signal on line 18 representative of the difference between the two supplied numbers. Adding circuit 17 may be of conventional construction, for example, as described by F. C. Williams, et al. in their Patent 2,643,820, issued June 30, 1953, to provide, in addition to the difference signal on line 18, signals on lines 19 and 20, indicative respectively of the no-carry and carry status of the adding circuit.

The apparatus of FIG. 1 also includes means for starting adding circuit 17 off in the carry status at the beginning of each word cycle and includes line 21 coupled to the timing unit 22, which unit is of conventional construction to provide a pulse designated "preset-to-carry" before each word cycle as shown in the timing diagram in FIG. 2. Unit 22 also provides on line 23 a pulse designated "end-of-word" which may occur in synchronism with the last pulse in the word cycle or may exist as a separate pulse between the last pulse in the word cycle and the "preset-to-carry" pulse associated with the next word cycle as shown in FIG. 2.

The apparatus also includes temporary storage means including storage tracks 25 and 26 for storing the minuend signal occurring on line 13 and the difference signal occuring on line 18 during each word cycle. This temporary storage means is responsive to the carry status indication of the adding circuit on lines 19 and 20 at the end of each word cycle for presenting the stored minuend signal from track 25 to adding circuit 17 as the minuend in the next succeeding cycle if circuit 17 ends in a status indicative of an invalid subtraction and for presenting the stored difference signal from track 26 as the next minuend signal if circuit 17 ends in a status indicative of a valid subtraction. In the apparatus of FIG. 1 a no-carry status indication, for example the D.-C. potential, occurs on line 19 in the case of invalid subtraction and a carry status indication, again a D.-C. potential, occurs on line 20 in the case of a valid subtraction. The "end-of-word" pulse on line 23 is coupled through gate 27, when properly conditioned by the no-carry status indication on line 19, to one side of a conventional bistable circuit 28 or through gate 29, if properly conditioned by the carry status indication on line 20, to the other side of bistable circuit 28. The "end-of-word" pulse translated through gate 29 is also coupled to read-out apparatus 40 to serve as the output signal from the conditional subtraction apparatus of FIG. 1.

One output side of bistable circuit 28 indicative of an invalid subtraction is coupled to gate 30 to condition the gate to translate the signal from storage track 25 to line 31 which is coupled to lines 12 and 13. The other output side of bistable circuit 28 indicative of a valid subtraction is coupled to gate 32 to condition the gate to translate the output from storage track 26 to line 31. It will be appreciated that the minuend signal being recorded during the first word cycle on storage track 25 and the difference signal simultaneously being recorded during the first word cycle on storage track 26 are arranged to appear simultaneously at the inputs of gates 30 and 32, respectively, during the second word cycle by locating the read head of each track, relative to the speed of rotation of the tracks, exactly one word length beyond the respective recording head. The signals on tracks 25 and 26 are erased immediately after being read out to enable new signals to be read onto the track. For this purpose, a conventional erase head, for example a permanent magnet, is placed just beyond the recording head in the direction of rotation of the storage track.

*Operation of FIG. 1 Apparataus*

Before considering the operation of the FIG. 1 apparatus, it will be helpful first to understand the nature of the conditional subtraction as it is performed in the apparatus. It will be assumed that the binary number 12 is to be translated from circuits 11 to read-out apparatus 40 and that the table consists of a series of eight binary numbers arranged in descending-binary-coded decimal form. In binary notation with the least significant digit to the right, the number 12 is written:

12=....000001100

Also in binary notation and with the least significant digit again to the right, the table series is written as follows with the binary-coded-decimal notation alongside for comparison purposes:

| Decimal | Binary | Binary-Coded-Decimal |
|---|---|---|
| 80= | ....001010000 | =....010000000 |
| 40= | ....000101000 | =....001000000 |
| 20= | ....000010100 | =....000100000 |
| 10= | ....000001010 | =....000010000 |
| 8= | ....000001000 | =....000001000 |
| 4= | ....000000100 | =....000000100 |
| 2= | ....000000010 | =....000000010 |
| 1= | ....000000001 | =....000000001 |

In the first conditional subtraction cycle as it performed according to the invention, the adding circuit is initially set in a carry status and the binary complement of the subtrahend 80 is added to the minuend 12. Starting the adding circuit off in a carry status is comparable to adding a "1" in the first digit position. The process is written as follows:

| | | | | | | | | |
|---|---|---|---|---|---|---|---|---|
| Carry Status | N | N....N | N | C | C | C | C | C |
| 12 | | 0....0 | 0 | 0 | 1 | 1 | 0 | 0 |
| −80 | | 1....0 | 1 | 1 | 1 | 1 | 1 | 1 |
| X | | 1....0 | 1 | 1 | 1 | 1 | 0 | 0 |

where N represents a no-carry status and C represents a carry status. The existence of a no-carry status at the end of the cycle indicates an invalid subtraction and causes the binary number 12 to be used as the minuend in the next conditional subtraction cycle.

The conditional subtraction with the numbers 40 and 20 also produces invalid subtractions and so, the binary number 12 is carried over as the minuend in the fourth conditional subtraction written as follows:

| | | | | | | | | |
|---|---|---|---|---|---|---|---|---|
| Carry Status | C | C....C | C | C | C | N | C | C |
| 12 | | 0....0 | 0 | 0 | 1 | 1 | 0 | 0 |
| −10 | | 1....1 | 1 | 1 | 0 | 1 | 0 | 1 |
| 2 | | 0....0 | 0 | 0 | 0 | 0 | 1 | 0 |

The existence of a carry status at the end of the cycle indicates a valid subtraction and the difference 2 is now used as the minuend in the next conditional subtraction cycle. The sutbraction of the numbers 8 and 4 from 2, are, of course, invalid subtractions and so the minuend 2 is carried over to the next to the last conditional subtraction cycle with the subtrahend number 2. This is written as follows:

| | | | | | | | | |
|---|---|---|---|---|---|---|---|---|
| Carry Status | C | C....C | C | C | C | C | C | C |
| 2 | | 0....0 | 0 | 0 | 0 | 0 | 1 | 0 |
| −2 | | 1....1 | 1 | 1 | 1 | 1 | 0 | 1 |
| 0 | | 0....0 | 0 | 0 | 0 | 0 | 0 | 0 |

The next subtraction cycle with the subtrahend "1" is, of course, invalid and therefore does not produce an output. The output signal is now written:

12=....00010010 where each digit position represents the validity of the result of a conditional subtraction cycle.

It is important to note that by starting the adding circuit off in a carry status and adding the binary complement of the table number to the number to be transferred, the status of the adding circuit at the end of the cycle gives an unambiguous indication of the validity of the subtraction even in the case where the difference is zero. This indication can then be used to cause the translation, from a temporary storage arrangement, of the difference signal or the old minuend signal to be used as the minuend signal for the next cycle of conditional subtraction without the need for regenerating the old minuend signal. The manner in which the apparatus of FIG. 1 performs this operation will now be considered.

Initially the storage tracks 25 and 26 are electrically empty due to the action of the erase head in preventing the signals from existing thereon for more than one complete word cycle. At the beginning of the first cycle in the conditional subtraction process, the "preset-to-carry" pulse on line 21 sets adding circuit 17 to a carry status, thus causing a potential on line 20 to condition gate 29 to translate any pulses therethrough. However, the "end-of-word" pulse on line 23 occurs only at the end of each cycle and, therefore, no pulse can be translated through either of gates 27 or 29 until the end of the cycle.

After adding circuit 17 has been set to the carry status, the minuend and complemented subtrahend numbers are applied thereto on lines 12 and 16, added, and the difference signal appears at line 18. Simultaneously, the signal on line 12 is also applied by line 13 to storage track 25. Thus, the difference signal on line 18 and the old minuend signal on line 13 are simultaneously recorded on tracks 25 and 26, respectively, so that as the first digit of the old minuend appears under the read head of track 25 at the beginning of the second word cycle, the first digit of the difference signal also appears under the read head of track 26.

As the two numbers are added in circuit 17 during the first word cycle, conditioning signals are variously applied to gates 27 and 29 depending on the manner in which the carry status of adding circuit 17 varies during the addition. In the assumed example, where the first subtrahend number is larger than the minuend, line 19 at the end of the cycle has a no-carry status indication thereon and conditions gate 27 to translate the "end-of-word" pulse from line 23 to the left-hand input of bistable circuit 28. Since the "end-of-word" pulse is blocked through gate 29, no output appears at read-out apparatus 40 or at the right-hand input of circuit 28.

Bistable circuit 28 produces a D.-C. potential at the left-hand output thereof which conditions gate 30 to translate the old minuend signal from circuit 25 therethrough during the entire second word cycle. The right-hand side of bistable circuit 28 simultaneously closes gate 32 thus preventing the translation of the invalid difference signal therethrough. The old minuend signal appearing on line 31 is then translated along line 13 to be re-recorded on track 25 and along line 12 to appear as a minuend signal in the next succeeding word cycle. The cycle then repeats itself as the "preset-to-carry" pulse appears on line 21.

The operation is essentially the same in the case of a valid subtraction except that a conditioning signal appears on line 20 at the end of the cycle enabling gate 29 to translate the "end-of-word" pulse to the right-hand input side of bistable circuit 28 and also to read-out apparatus 40. Bistable circuit 28 then conditions gate 32 to translate therethrough the valid difference signal from storage track 26. This difference signal then becomes the minuend signal for the next word cycle and at the same time is simultaneously recorded on storage track 25.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for performing conditional subtraction in an uninterrupted series of word cycles, comprising: means for supplying two serial signals representative of binary minuend and subtrahend numbers, one of said signals being supplied in binary complement form; an adding circuit responsive to said supplied signals for developing an output signal representative of the difference between said two numbers; means for starting the adding circuit off in a carry status at the beginning of each word cycle; and temporary storage means for storing said minuend and difference signals during each word cycle and being responsive to the carry status of the adding circuit at the end of each cycle for presenting said stored minuend signal to the adding circuit as the minuend in the next succeeding cycle if the adding circuit ends in a status indicative of an invalid subtraction and said stored difference signal if the adding circuit ends in a status indicative of a valid subtraction.

2. Apparatus for performing conditional subtraction in an uninterrupted series of word cycles, comprising: means for supplying two serial signals representative of binary minuend and subtrahend numbers, the subtrahend signal being supplied in binary complement form; an adding circuit responsive to the minuend and complemented subtrahend signals for developing an output signal representative of the difference between said two numbers; means for starting the adding circuit off in a carry status at the beginning of each word cycle; and temporary storage means for storing said minuend and difference signals during each word cycle and responsive to the carry status of the adding circuit at the end of each cycle for presenting to the adding circuit as the minuend in the next succeeding cycle said stored minuend signal if the adding circuit ends in a status indicative of an invalid subtraction and said stored difference signal if the adding circuit ends in a status indicative of a valid subtraction.

3. Apparatus for performing conditional subtraction in an uninterrupted series of word cycles, comprising: means for supplying two serial signals representative of binary minuend and subtrahend numbers, one of said signals being supplied in binary complement form; an adding circuit responsive to the minuend and complemented subtrahend signals for developing an output signal representative of the difference between said two numbers; means for starting the adding circuit off in a carry status at the beginning of each word cycle; and temporary storage means for storing said minuend and difference signals during each word cycle and responsive to the carry status of the adding circuit at the end of each cycle for presenting to the adding circuit as the minuend in the next succeeding cycle said stored minuend signal if the adding circuit ends in a no-carry status indicative of an invalid subtraction and said stored difference signal if the adding circuit ends in a carry status indicative of a valid subtraction.

4. Apparatus for performing conditional subtraction in an uninterrupted series of word cycles, comprising: means for supplying two serial signals representative of binary minuend and subtrahend numbers, the subtrahend signal being supplied in binary complement form; an adding circuit responsive to the minuend and complemented subtrahend signals for developing an output signal representative of the difference between said two numbers; means for starting the adding circuit off in a carry status at the beginning of each word cycle; and temporary storage means for storing said minuend and difference signals during each word cycle and responsive to the carry status of the adding circuit at the end of each cycle for presenting to the adding circuit as the minuend in the next succeeding cycle said stored minuend signal if the adding circuit ends in a no-carry status indicative of an invalid subtraction and said stored difference signal if the adding circuit ends in a carry status indicative of a valid subtraction.

5. Apparatus for performing conditional subtraction in an uninterrupted series of word cycles, comprising: means for supplying two serial signals, representative of binary minuend and subtrahend numbers, the subtraend representative signal consisting of a series of binary numbers ranging in descending numerical order in successive word cycles and being supplied in binary complement form; an adding circuit responsive to the minuend and complemented subtrahend signals for developing an output signal representative of the difference between said two numbers;

means for starting the adding circuit off in a carry status at the beginning of each word cycle; and temporary storage means for storing said minuend and difference signals during each word cycle and responsive to the carry status of the adding circuit at the end of each cycle for presenting to the adding circuit as the minuend in the next succeeding cycle said stored minuend signal if the adding circuit ends in a status indicative of an invalid subtraction and said stored difference signal from said preceding cycle if the adding circuit ends in a status indicative of a valid subtraction.

6. Apparatus for performing conditional subtraction in an uninterrupted series of word cycles, comprising: means for supplying two serial signals representative of binary minuend and subtrahend numbers, the subtrahend representative signal consisting of a series of binary numbers ranging in descending numerical order in successive word cycles and being supplied in binary complement form; an adding circuit responsive to the minuend and complemented subtrahend signals for developing an output signal representative of the difference between said two numbers; means for starting the adding circuit off in a carry status at the beginning of each word cycle; and temporary storage means for storing said minuend and difference signals during each word cycle and responsive to the carry status of the adding circuit at the end of each cycle for presenting to the adding circuit as the minuend in the next succeeding cycle said stored minuend signal if the adding circuit ends in a no-carry status indicative of an invalid subtraction and said stored difference signal from said preceding cycle if the adding circuit ends in a carry status indicative of a valid subtraction.

7. Apparatus for performing conditional subtraction in an uninterrupted series of word cycles, comprising: means for supplying two serial signals representative of binary minuend and subtrahend numbers, one of said signals being supplied in binary complement form; an adding circuit responsive to the minuend and complemented subtrahend signals for developing an output signal representative of the difference between said two numbers and including a bistable circuit for indicating the carry status of the adding circuit; means for starting the adding circuit off in a carry status at the beginning of each word cycle; and temporary storage means for storing said minuend and difference signals during each word cycle and having a switching circuit responsive to the status indication of said bistable circuit at the end of each cycle for presenting to the adding circuit as the minuend in the next succeeding cycle said stored minuend signal if the adding circuit ends in a no-carry status indicative of an invalid subtraction and said stored difference signal if the adding circuit ends in a carry status indicative of a valid subtraction.

References Cited in the file of this patent

FOREIGN PATENTS 745,907 Great Britain ------------ Mar. 7, 1956

OTHER REFERENCES

Richards: Arithmetic Operations in Digital Computers, D. Van Nostrand and Co., Inc., Princeton, N.J. (March 17, 1955), pages 124–126.